(12) United States Patent
Van Dyck et al.

(10) Patent No.: US 8,807,734 B2
(45) Date of Patent: Aug. 19, 2014

(54) UV CURABLE INKJET COMPOSITIONS FOR HIGH-DENSITY PRINT HEADS

(75) Inventors: Geert Van Dyck, Ham (BE); David Tilemans, Lier (BE)

(73) Assignee: Agfa Graphics NV, Mortsel (BE)

( * ) Notice: Subject to any disclaimer, the term of this patent is extended or adjusted under 35 U.S.C. 154(b) by 294 days.

(21) Appl. No.: 13/394,552

(22) PCT Filed: Sep. 22, 2010

(86) PCT No.: PCT/EP2010/063933
§ 371 (c)(1),
(2), (4) Date: Mar. 7, 2012

(87) PCT Pub. No.: WO2011/039081
PCT Pub. Date: Apr. 7, 2011

(65) Prior Publication Data
US 2012/0194616 A1   Aug. 2, 2012

Related U.S. Application Data

(60) Provisional application No. 61/250,022, filed on Oct. 9, 2009.

(30) Foreign Application Priority Data

Oct. 2, 2009  (EP) .................................... 09172025

(51) Int. Cl.
*B41J 2/14* (2006.01)
*C09D 11/10* (2014.01)
*B41J 11/00* (2006.01)
*C09D 11/00* (2014.01)

(52) U.S. Cl.
CPC .............. *C09D 11/40* (2013.01); *C09D 11/101* (2013.01); *B41J 11/0015* (2013.01); *B41J 11/002* (2013.01); *C09D 11/30* (2013.01)

USPC .............................. 347/102; 347/95; 347/100

(58) Field of Classification Search
CPC ........ B41J 2/01; B41J 11/002; B41J 11/0015; B41J 2/0015; B41J 2/002; C09D 11/30; C09D 11/101; C09D 11/322
USPC ................ 347/95–100, 102; 106/31.13, 31.6; 523/160, 161
See application file for complete search history.

(56) References Cited

U.S. PATENT DOCUMENTS

| 6,310,115 B1 | 10/2001 | Vanmaele et al. |
| 2004/0080574 A1* | 4/2004 | Masumi .......................... 347/47 |
| 2009/0000508 A1* | 1/2009 | Edison et al. ................. 106/31.6 |

(Continued)

FOREIGN PATENT DOCUMENTS

| EP | 1 935 652 A1 | 6/2008 |
| EP | 2 017 311 A1 | 1/2009 |

(Continued)

OTHER PUBLICATIONS

Official Communication issued in International Patent Application No. PCT/EP2010/063933, mailed on Jan. 24, 2011.

*Primary Examiner* — Matthew Luu
*Assistant Examiner* — Rut Patel
(74) *Attorney, Agent, or Firm* — Keating & Bennett, LLP

(57) ABSTRACT

A combination of: a) an inkjet print head having a nozzle density of at least 600 dpi and nozzles with an outer nozzle diameter D smaller than 25μm; and b) a UV curable inkjet composition containing 0 to 10 wt % of one or more monofunctional monomers and at least A wt % of 2-(2-vinyloxyethoxy)ethyl acrylate, wherein both wt % are based on the total weight of the UV curable inkjet composition; and wherein A is defined by the formula 100 wt %–D×3.0 wt %/μm≤A≤100 wt %–D×1.0 wt %/μm.

15 Claims, 2 Drawing Sheets

(56) References Cited

U.S. PATENT DOCUMENTS

2009/0099277 A1 4/2009 Nagvekar et al.
2009/0280302 A1* 11/2009 Fukumoto et al. ......... 428/195.1

FOREIGN PATENT DOCUMENTS

| WO | 2006/085992 A2 | 8/2006 |
| WO | 2008/074589 A1 | 6/2008 |

* cited by examiner

UV CURABLE INKJET COMPOSITIONS FOR HIGH-DENSITY PRINT HEADS

CROSS-REFERENCE TO RELATED APPLICATIONS

This application is a 371 National Stage Application of PCT/EP2010/063933, filed Sep. 22, 2010. This application claims the benefit of U.S. Provisional Application No. 61/250,022, filed Oct. 9, 2009, which is incorporated by reference herein in its entirety. In addition, this application claims the benefit of European Application No. 09172025.0, filed Oct. 2, 2009, which is also incorporated by reference herein in its entirety.

BACKGROUND OF THE INVENTION

1. Field of the Invention

The present invention relates to UV curable inkjet compositions, and more specifically to UV curable inkjet inks, which are suitable for jetting by high-density print heads having small outer nozzle diameters.

2. Description of the Related Art

In inkjet printing, tiny drops of fluid are projected directly onto an ink-receiver surface without physical contact between the printing device and the ink-receiver. The printing device stores the printing data electronically and controls a mechanism for ejecting the drops image-wise. Printing is accomplished by moving a print head across the ink-receiver or vice versa or both.

When jetting inkjet ink onto an ink-receiver, the ink typically includes a liquid vehicle and one or more solids, such as dyes or pigments and polymers. Ink compositions can be roughly divided in:

water-based, the drying mechanism involving absorption, penetration and evaporation;

solvent-based, the drying primarily involving evaporation;

oil-based, the drying involving absorption and penetration;

hot melt or phase change, in which the ink is liquid at the ejection temperature but solid at room temperature and wherein drying is replaced by solidification; and UV-curable, in which drying is replaced by polymerization.

It should be clear that the first three types of ink compositions are more suitable for an absorbing ink-receiver, whereas hot melt inks and UV-curable inks can also be printed on non-absorbing ink-receivers. Due to thermal requirements posed by hot melt inks on the substrates, especially UV curable inks have gained the interest of the industry in inkjet printing applications.

Industrial inkjet continues to require higher printing speeds and thinner image layers for UV curable inks. Thinner image layers lead to an improvement of flexibility and a lower production cost which can be obtained by allowing an ink droplet to spread on an ink receiver during a longer time period. However, this is disadvantageous for image quality. In order to achieve higher printing speeds and to maintain image quality, the fire frequency and/or nozzle density have to be increased.

Increasing the nozzle density leads to smaller nozzle diameters and thus smaller ink droplet volumes. For example, at 360 dpi the droplet volume is about 87 pL and leads to an ink layer thickness of 17.5 ml/m². At 900 dpi, the droplet volume becomes 7.7 pL and the resulting ink layer thickness is only 9.7 mL/m².

A problem is that smaller ink droplets exhibit a smaller droplet velocity because of relatively higher friction losses in a nozzle. The skilled person knows that droplet velocity can be increased by addition of organic solvent or the use of monofunctional monomers.

However, organic solvents tend to evaporate at the nozzles of an inkjet print head during a prolonged non-printing time. When restarting the printer, some nozzles appear to be clogged (=failing nozzles). This phenomenon is called latency. When high levels of organic solvents are employed, evaporation of such solvents in the drying process potentially presents both environmental and health and safety hazards. Using large amounts of monofunctional monomers in an ink generally exhibit a lower curing speed of the ink.

US 2009099277 (HEXION) discloses a radiation curable and jettable ink composition comprising an ethylenically unsaturated polyfunctional component and an ethylenically unsaturated monofunctional monomer, wherein the composition is substantially free of solvent.

U.S. Pat. No. 6,310,115 (AGFA) discloses radiation curable inkjet compositions for containing radiation curable polyfunctional monomers containing vinyl ether and acrylate functions.

Therefore, there exists a need in industrial inkjet printing for higher printing speeds and thinner image layers with UV curable inks, while maintaining good curing speed, image quality and latency.

SUMMARY OF THE INVENTION

It has been surprisingly discovered that the use of a difunctional monomer comprising both a vinyl ether and an acrylate as polymerizable group when present in a certain amount in the ink allowed reliable inkjet printing at high printing speed with a high nozzle density print head having outer nozzle diameters smaller than 25 μm, thereby producing thinner image layers with UV curable inks, while maintaining good curing speed, image quality and latency.

In order to overcome the problems described above, preferred embodiments of the present invention provide a combination of an inkjet print head and a UV curable inkjet composition as defined below producing thin layer images of high image quality at a high printing speed.

Further advantages and preferred embodiments of the present invention will become apparent from the following description.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
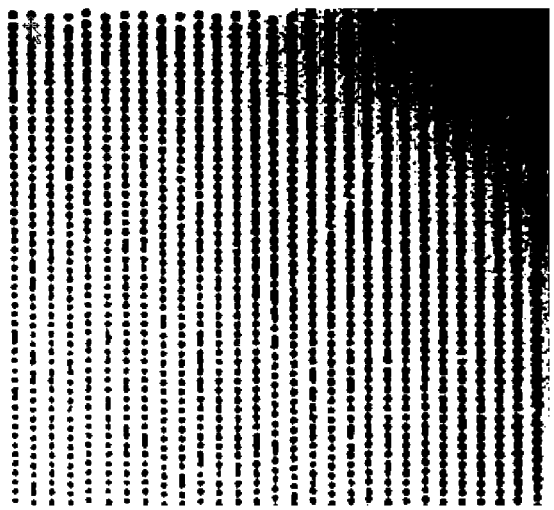
FIG. 1 to FIG. 5 are photographs of straight lines of ink droplets jetted by a print head at different viscosities and/or outer nozzle diameters for evaluating the inkjet printing reliability.

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as a colorant that is practically insoluble in the application medium under the pertaining ambient conditions, hence having a solubility of less than 10 mg/L therein.

The term "C.I." is used in disclosing the present application as an abbreviation for Color Index.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

The term "monofunctional monomer" means a monomer containing only one polymerizable group.

The term "polyfunctional monomer" means a monomer containing two or more polymerizable groups.

The term "VEEA" is used as an abbreviation for 2-(2-vinyloxyethoxy)ethyl acrylate.

Inkjet Print Heads

The inkjet print heads according to preferred embodiments of the present invention have a nozzle density of at least 600 dpi, more preferably 900 to 1200 dpi. The nozzles of the inkjet print head have an outer nozzle diameter D smaller than 25 µm, more preferably between 14 and 22 µm. The nozzles usually have a cone shape wherein the inner nozzle diameter in the nozzle plate on the inside of the print head is much larger than the outer nozzle diameter in the nozzle plate on the outside of the print head. The outer nozzle diameter is the smallest diameter of a nozzle.

A preferred printing head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the printing head creating a void, which is then filled with ink. When the voltage is again removed, the ceramic expands to its original shape, ejecting a drop of ink from the print head. However the inkjet printing method according to preferred embodiments of the present invention is not restricted to piezoelectric inkjet printing. Other inkjet printing heads can be used and include various types, such as a continuous type and thermal, electrostatic and acoustic drop on demand type.

The manufacture of inkjet print heads is well known to the skilled person. For example, the nozzles on a nozzle plate of the print head can be drilled mechanically or can be made using a laser. Outer nozzle diameters above 5 µm can reproducible be made using a laser.

At high printing speeds, the inks must be ejected readily from the printing heads, which puts a number of constraints on the physical properties of the ink, e.g. a low viscosity at the jetting temperature, a surface energy such that the printing head nozzle can form the necessary small droplets, a homogenous ink capable of rapid conversion to a dry printed area, . . .

The inkjet printing head normally scans back and forth in a transversal direction across the moving ink-receiver surface. It is allowed that the inkjet print head does not print on the way back, but bi-directional printing is preferred for obtaining a high areal throughput.

A more preferred printing method is by a "single pass printing process", which can be performed by using page wide inkjet printing heads or multiple staggered inkjet printing heads which cover the entire width of the ink-receiver surface. In a single pass printing process the inkjet printing heads usually remain stationary and the ink-receiver surface is transported under the inkjet printing heads.

UV Curable Compositions and Inks

The UV curable inkjet composition according to a preferred embodiment of the present invention contains 0 to 10 wt % of one or more monofunctional monomers and at least A wt % of 2-(2-vinyloxyethoxy)ethyl acrylate, wherein both wt % are based on the total weight of the UV curable inkjet composition; and wherein A is defined by the Formula (I):

$$100 \text{ wt \%} - D \times 3.0 \text{ wt \%/µm} \leq A \leq 100 \text{ wt \%} - D \times 1.0 \text{ wt \%/µm} \qquad \text{Formula (I)}.$$

In a more preferred embodiment, the UV curable inkjet composition contains 0 to 10 wt % of one or more monofunctional monomers and at least A wt % of 2-(2-vinyloxyethoxy)ethyl acrylate, wherein both wt % are based on the total weight of the UV curable inkjet composition; and wherein A is defined by the Formula (II):

$$100 \text{ wt \%} - D \times 2.5 \text{ wt \%/µm} \leq A \leq 100 \text{ wt \%} - D \times 1.5 \text{ wt \%/µm} \qquad \text{Formula (II)}.$$

The UV curable inkjet composition according to a preferred embodiment of the present invention contains no more than 10 wt % of a monofunctional monomer. A higher amount has a negative effect on curing speed and latency. In a more preferred embodiment no monofunctional monomer is present in the UV curable inkjet composition.

Besides VEEA and an optional monofunctional monomer, the UV curable inkjet composition may contain polyfunctional monomers, colorants, polymers, surfactants, photoinitiators, co-initiators, inhibitors and other additives. The polyfunctional monomers or oligomers preferably include at least two acrylate groups.

The UV curable composition may contain a colorant, which is most preferably a pigment. When the UV curable inkjet composition contains a colorant, it is usually referred to as an UV curable inkjet ink.

In a preferred embodiment, inkjet printing is performed with an inkjet ink set including a plurality of UV curable inkjet inks. The UV curable compositions and inks are preferably part of an inkjet ink set, comprising at least one yellow curable ink (Y), at least one cyan curable ink (C) and at least one magenta curable ink (M) and preferably also at least one black curable ink (K). The curable CMYK-ink set may also be extended with extra inks such as red, green, blue, violet and/or orange to further enlarge the colour gamut of the image. The CMYK-ink set may also be extended by the combination of full density and light density inks of both colour inks and/or black inks to improve the image quality by lowered graininess. The UV curable inkjet ink set preferably contains also one or more white inkjet inks.

The pigmented UV curable ink preferably contains a dispersant, more preferably a polymeric dispersant, for dispersing the pigment. The pigmented curable ink may contain a dispersion synergist to improve the dispersion quality and stability of the ink. Preferably, at least the magenta ink contains a dispersion synergist. A mixture of dispersion synergists may be used to further improve dispersion stability.

The viscosity of the UV curable compositions and inks is preferably smaller than about 10 mPa·s, more preferably smaller than about 8 mPa·s, and most preferably smaller than about 6.5 mPa·s at 45° C. and at a shear rate of 1000 s$^{-1}$.

The surface tension of the UV curable composition and ink is preferably in the range of about 18 mN/m to about 70 mN/m at 25° C., more preferably in the range of about 20 mN/m to about 40 mN/m at 25° C.

The UV curable composition or ink may further also contain at least one inhibitor for improving the thermal stability of composition or ink The UV curable composition or ink may further also contain at least one surfactant.

Other Monomers and Oligomers

The monomers and oligomers other than 2-(2-vinyloxyethoxy)ethyl acrylate used in the UV curable compositions and inks, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Any monomer or oligomer capable of free radical polymerization may be used as polymerizable compound. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the UV curable compositions and inks can be adjusted by varying the ratio between the monomers and oligomers.

Particularly preferred monomers and oligomers are those listed in [0106] to [0115] in EP 1911814 A (AGFA GRAPHICS) incorporated herein as a specific reference.

A preferred class of monomers and oligomers are vinyl ether acrylates such as those described in U.S. Pat. No. 6,310,115 (AGFA), incorporated herein by reference.

Photoinitiators

The UV curable inkjet composition according to a preferred embodiment of the present invention includes preferably a photoinitiator or photoinitiator system such as, for example, one or more photoinitiators and one or more co-initiators. The photoinitiator or photoinitiator system absorbs light and is responsible for the production of initiating species, i.e. free radicals which induce the polymerization of monomers, oligomers and polymers and with polyfunctional monomers and oligomers thereby also induce cross-linking.

Irradiation with actinic radiation may be realized in two steps by changing wavelength or intensity. In such cases it is preferred to use 2 types of photoinitiator together.

Free radical photoinitiators can act as a Norrish type I or a Norrish type II initiator. Tertiary amines are today admixed to free radical polymerizable radiation curable formulations for two main reasons:
i) They counteract air inhibition, provided that the particular amine contains abstractable α-hydrogens, by formation of radicals, which can participate and trigger radical polymerisation of acrylic groups. Tertiary amines can therefore be used together with Norrish type I photoinitiators to reduce air inhibition and thereby increase cure speed; and
ii) They can act as co-initiators together with ketones, for example, of the benzophenone type, wherein the excited keto groups abstract a hydrogen from the amine, whereby radicals are formed promoting radical polymerisation of acrylic groups and the like. This is the so called Norrish type II of photopolymerization.

A suitable Norrish type I-photoinitiator is selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

A suitable Norrish type II-initiator is selected from the group consisting of benzophenones, thioxanthones, 1,2-diketones and anthraquinones.

Other photoinitiators suitable for the photoinitiating functional groups in preparing diffusion hindered photoinitiators are disclosed by CRIVELLO, J. V., et al.; Chemistry & technology of UV & EB Formulation for Coatings, Inks & Paints. Volume III: Photoinitiators for Free Radical, Cationic & Anionic Photopolymerisation, 2nd edition, John Wiley & Sons Ltd in association with SITA Technology Ltd, London, UK, 1998 edited by Dr. G. Bradley; ISBN 0471 978922, page 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4, 4-trimethylpentylphosphine oxide, 2,4,6-trimethylbenzoyldiphenylphosphine oxide, ethyl-2,4,6-trimethylbenzoylphenylphosphinate, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone, diphenyliodonium fluoride and triphenylsulfonium hexafluophosphate.

Suitable commercial photo-initiators include IRGACURE™ 184, IRGACURE™ 500, IRGACURE™ 907, IRGACURE™ 369, IRGACURE™ 379, IRGACURE™ 1700, IRGACURE™ 651, IRGACURE™ 819, IRGACURE™ 907, IRGACURE™ 1000, IRGACURE™ 1300, IRGACURE™ 1870, DAROCUR™ 1173, DAROCUR™ 2959, DAROCUR™ 4265 and DAROCUR™ ITX available from CIBA SPECIALTY CHEMICALS, LUCIRIN™ TPO, LUCIRIN™ TPO-L available from BASF AG, ESACURE™ KT046, ESACURE™ KIP150, ESACURE™ KT37 and ESACURE™ EDB available from LAMBERTI, H-NU™ 470 and H-NU™ 470X available from SPECTRA GROUP Ltd.

For safety reasons, in particular for food packaging applications, the UV curable inkjet composition according to a preferred embodiment of the present invention preferably contains a so-called diffusion hindered photoinitiator. A diffusion hindered photoinitiator is a photoinitiator which exhibits a much lower mobility in a cured layer of the curable liquid or ink than a monofunctional photoinitiator, such as benzophenone. Several methods can be used to lower the mobility of the photoinitiator. One way is to increase the molecular weight of the photoinitiator so that the diffusion speed is reduced, e.g. difunctional photoinitiators or polymeric photoinitiators. Another way is to increase its reactivity so that it is built into the polymerizing network, e.g. multifunctional photoinitiators and polymerizable photoinitiators. The diffusion hindered photoinitiator is preferably selected from the group consisting of non-polymeric di- or multifunctional photoinitiators, oligomeric or polymeric photoinitiators and polymerizable photoinitiators. Non-polymeric di- or multifunctional photoinitiators are considered to have a molecular weight between 300 and 900 Dalton. Monofunctional photoinitiators with a molecular weight in that range are not diffusion hindered photoinitiators. Both type I and type II photoinitiators can be used in the present invention, alone or in combination. Most preferably the UV curable inkjet composition contains one or more polymerizable photoinitiators. Preferably the polymerizable photoinitiator contains an acrylate group as polymerizable group.

A preferred amount of photoinitiator is 0.3-50 wt % of the total weight of the UV curable inkjet composition, and more preferably 1-15 wt % of the total weight of the UV curable inkjet composition.

Co-Initiators

Suitable examples of co-initiators can be categorized in 3 groups:
(1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; and
(3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate).

The preferred co-initiators are aminobenzoates, preferably polymerizable aminobenzoates.

When one or more co-initiators are included in the UV curable inkjet composition according to a preferred embodiment of the present invention, preferably these co-initiators are also diffusion hindered.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator.

A preferred diffusion hindered co-initiator is a polymeric co-initiator having a dendritic polymeric architecture, more preferably a hyperbranched polymeric architecture. Preferred hyperbranched polymeric co-initiators are those disclosed in US 2006014848 (AGFA) incorporated herein as a specific reference.

A more preferred diffusion hindered co-initiator is one or more polymerizable co-initiators. In a preferred embodiment the polymerizable co-initiator comprises at least one (meth)acrylate group, most preferably at least one acrylate group.

A preferred polymerizable co-initiator is a co-initiator according to Formula (CO—I):

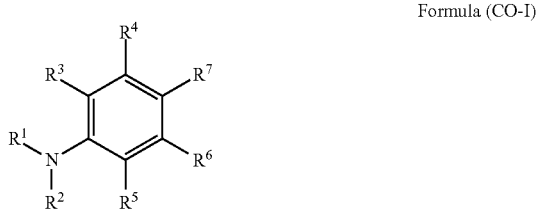

Formula (CO-I)

wherein,
$R^1$ and $R^2$ are independently selected from the group consisting of an alkyl group, an alkenyl group, an alkynyl group, an aralkyl group, an alkaryl group, an aryl group and a heteroaryl group;
$R^3$ to $R^6$ are independently selected from the group consisting of hydrogen, an alkyl group, an alkenyl group, an alkynyl group, an acyl group, a thioalkyl group, an alkoxy group, a halogen, an aralkyl group, an alkaryl group, an aryl group and a heteroaryl group;
$R^7$ is selected from the group consisting of hydrogen, an aldehyde group, a ketone group, an ester group, an amide group, an acyl group, a thioalkyl group, an alkoxy group, a halogen, a nitrile group, a sulphonate group, a sulphonamide group, an alkyl group, an alkenyl group, an alkynyl group, an aralkyl group, an alkaryl group, an aryl group and a heteroaryl group;
$R^1$ and $R^2$, $R^1$ and $R^3$, $R^2$ and $R^5$, $R^3$ and $R^4$, $R^4$ and $R^7$, $R^5$ and $R^6$, and $R^6$ and $R^7$ may represent the necessary atoms to form a 5- to 8-membered ring; and with the proviso that the aromatic amine has at least one Alfa hydrogen; and
at least one of $R^4$ to $R^7$ comprises a polymerizable ethylenically unsaturated functional group selected from the group consisting of acrylate, substituted acrylate, methacrylate, styrene, acrylamide, methacrylamide, allyl ester, allyl ether, vinyl ester, vinyl ether, fumarate, maleate, maleimide and vinyl nitrile. In the polymerizable co-initiator, preferably $R^7$ represents an electron withdrawing group selected from the group consisting of an aldehyde, a ketone, an ester and an amide, and more preferably $R^3$, $R^4$, $R^5$ and $R^6$ all represent hydrogen.

The alkyl groups, alkenyl groups, alkynyl groups, aralkyl groups, alkaryl groups, aryl groups and heteroaryl groups used for $R^1$ to $R^7$ can be substituted or unsubstituted groups, i.e. a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted (hetero)aryl group may be used.

The UV curable inkjet composition preferably comprises the polymerizable co-initiator in an amount of 0.1 to 50 wt %, more preferably in an amount of 0.5 to 25 wt %, most preferably in an amount of 1 to 10 wt % of the total weight of the UV curable inkjet composition.

Inhibitors

The UV curable compositions and inks may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol, 2,6-di-tert.butyl-4-methylphenol may also be used.

Suitable commercial inhibitors are, for example, SUMILIZER™ GA-80, SUMILIZER™ GM and SUMILIZER™ GS produced by Sumitomo Chemical Co. Ltd.; GENORAD™ 16, GENORAD™ 18 and GENORAD™ 20 from Rahn AG; IRGASTAB™ UV10 and IRGASTAB™ UV22, TINUVIN™ 460 and CGS20 from Ciba Specialty Chemicals; FLOORSTAB™ UV range (UV-1, UV-2, UV-5 and UV-8) from Kromachem Ltd, ADDITOL™ S range (S100, S110, S120 and S130) from Cytec Surface Specialties.

The inhibitor is preferably a polymerizable inhibitor.

Since excessive addition of these polymerization inhibitors may lower the curing speed, it is preferred that the amount capable of preventing polymerization is determined prior to blending. The amount of a polymerization inhibitor is preferably lower than 5 wt %, more preferably lower than 3 wt % of the total ink or liquid.

Surfactants

The UV curable compositions and inks may contain a surfactant. The surfactant(s) can be anionic, cationic, non-ionic, or zwitter-ionic and are usually added in a total quantity less than 10 wt % based on the total weight of the UV curable compositions or ink and particularly in a total less than 5 wt % based on the total weight of the UV curable composition or ink.

Suitable surfactants include those disclosed in paragraphs [0283] to [0291] of WO 2008/074548 (AGFA GRAPHICS) incorporated herein as a specific reference.

Colorants

Colorants used in the UV curable inks may be dyes, pigments or a combination thereof. Organic and/or inorganic pigments may be used. The colorant is preferably a pigment or a polymeric dye, most preferably a pigment.

The pigments may be black, white, cyan, magenta, yellow, red, orange, violet, blue, green, brown, mixtures thereof, and the like. This colour pigment may be chosen from those disclosed by HERBST, Willy, et al. Industrial Organic Pigments, Production, Properties, Applications. 3rd edition. Wiley—VCH, 2004. ISBN 3527305769.

Suitable pigments are disclosed in paragraphs [0128] to [0138] of WO 2008/074548 (AGFA GRAPHICS).

Suitable pigments include mixed crystals of the above particular preferred pigments. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia Magenta RT-355-D from Ciba Specialty Chemicals.

Also mixtures of pigments may be used in the UV curable inks. For some inkjet applications, a neutral black inkjet ink is preferred and can be obtained, for example, by mixing a black pigment and a cyan pigment into the ink. The inkjet application may also require one or more spot colours, for example for packaging inkjet printing or textile inkjet printing. Silver and gold are often desired colours for inkjet poster printing and point-of-sales displays.

Non-organic pigments may be used in the colour inkjet inks. Particular preferred pigments are C.I. Pigment Metal 1, 2 and 3. Illustrative examples of the inorganic pigments include red iron oxide (III), cadmium red, ultramarine blue, prussian blue, chromium oxide green, cobalt green, amber, titanium black and synthetic iron black.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. An average particle size smaller than 0.050 μm is less desirable for decreased light-fastness, but mainly also because very small pigment particles or individual pigment molecules thereof may still be extracted in food packaging applications. The average particle size of pigment particles is determined with a Nicomp 30 Submicron Particle Analyzer based upon the principle of dynamic light scattering. The ink is diluted with ethyl acetate to a pigment concentration of 0.002 wt %.

However for a white UV curable ink, the numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a MALVERN™ nano-S available from Goffin-Meyvis. A sample can be, for example, be prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA GRAPHICS). The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548 (AGFA GRAPHICS).

The pigments are present in the range of 0.01 to 10% by weight, preferably in the range of 0.1 to 5% by weight, each based on the total weight of UV curable ink. For white UV curable inks, the white pigment is preferably present in an amount of 3% to 30% by weight of the ink composition, and more preferably 5% to 25%. An amount of less than 3% by weight cannot achieve sufficient covering power and usually exhibits very poor storage stability and ejection property.

Generally pigments are stabilized in the dispersion medium by dispersing agents, such as polymeric dispersants. However, the surface of the pigments can be modified to obtain so-called "self-dispersible" or "self-dispersing" pigments, i.e. pigments that are dispersible in the dispersion medium without dispersants.

Dispersants

The dispersant is preferably a polymeric dispersant. Typical polymeric dispersants are copolymers of two monomers but may contain three, four, five or even more monomers. The properties of polymeric dispersants depend on both the nature of the monomers and their distribution in the polymer. Suitable copolymeric dispersants have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS) incorporated herein as a specific reference.

The polymeric dispersant has preferably a number average molecular weight Mn between 500 and 30,000, more preferably between 1,500 and 10,000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

DISPERBYK™ dispersants available from BYK CHEMIE GMBH;
SOLSPERSE™ dispersants available from NOVEON;
TEGO™ DISPERS™ dispersants from DEGUSSA;
EDAPLAN™ dispersants from MÜNZING CHEMIE;
ETHACRYL™ dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Particularly preferred polymeric dispersants include SOLSPERSE™ dispersants from NOVEON, EFKA™ dispersants from CIBA SPECIALTY CHEMICALS INC and DISPERBYK™ dispersants from BYK CHEMIE GMBH. Particularly preferred dispersants are SOLSPERSE™ 32000, 35000 and 39000 dispersants from NOVEON.

The polymeric dispersant is preferably used in an amount of 2 to 600 wt %, more preferably 5 to 200 wt % based on the weight of the pigment.

Dispersion Synergists

A dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Suitable dispersion synergists that are commercially available include SOLSPERSE™ 5000 and SOLSPERSE™ 22000 from NOVEON.

Particular preferred pigments for the magenta ink used are a diketopyrrolo-pyrrole pigment or a quinacridone pigment. Suitable dispersion synergists include those disclosed in EP 1790698 A (AGFA GRAPHICS), EP 1790696 A (AGFA GRAPHICS), WO 2007/060255 (AGFA GRAPHICS) and EP 1790695 A (AGFA GRAPHICS).

In dispersing C.I. Pigment Blue 15:3, the use of a sulfonated Cu-phthalocyanine dispersion synergist, e.g. SOLSPERSE™ 5000 from NOVEON is preferred. Suitable dispersion synergists for yellow inkjet inks include those disclosed in EP 1790697 A (AGFA GRAPHICS).

Inkjet Printing Systems and Methods

The inkjet printing system according to a preferred embodiment of the present invention comprises the combination of the print head and the UV curable inkjet composition.

The inkjet printing method according to a preferred embodiment of the present invention comprises the steps of:
a) providing an inkjet printer containing at least one inkjet print head having a nozzle density of at least 600 dpi and nozzles with a diameter D smaller than 25 µm;
b) jetting, at a temperature between 30° C. and 50° C., a UV curable inkjet composition containing 0 to 10 wt % of one or more monofunctional monomers and at least A wt % of 2-(2-vinyloxyethoxy)ethyl acrylate, wherein both wt % are based on the total weight of the UV curable inkjet composition; and wherein A is defined by the formula (I):

$$100 \text{ wt \%} - D \cdot 3 \text{ wt \%/µm} \leq A \leq 100 \text{ wt \%} - D \cdot 1 \text{ wt \%/µm} \quad \text{Formula (I)};$$

c) curing the UV curable inkjet composition.

Preferably the inkjet printer of the inkjet printing system and inkjet printing method contains a plurality of inkjet print heads having a nozzle density of at least 600 dpi and nozzles with a diameter D smaller than 25 µm. Printing is preferably performed in a single pass.

The inkjet printing method according to a preferred embodiment of the present invention is wherein the printing is performed using an UV curable inkjet ink set comprising at least one cyan, at least one magenta, at least one yellow and at least one black UV curable inkjet ink.

The inkjet printing method according to a preferred embodiment of the present invention is wherein the droplet volume is smaller than 20 pL, more preferably smaller than 15 pL.

Curing Device

UV curable compositions and inks according to a preferred embodiment of the present invention are cured by a curing device exposing them to UV radiation. The curing device may be arranged in combination with the print head of the inkjet printer, travelling therewith so that the curable liquid is exposed to curing radiation very shortly after been jetted.

In such an arrangement it can be difficult to provide a small enough radiation source connected to and travelling with the print head. Therefore, a static fixed radiation source may be employed, e.g. a source of curing UV-light, connected to the radiation source by means of flexible radiation conductor such as a fibre optic bundle or an internally reflective flexible tube.

Alternatively, the actinic radiation may be supplied from a fixed source to the print head by an arrangement of mirrors including a mirror upon the print head.

The source of the curing device arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Preparation of Curable Inks

The average particle size and distribution of a colour pigment is an important feature for inkjet inks. The inkjet ink may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium oxide beads.

In the process of mixing, milling and dispersion, each process is performed with cooling to prevent build up of heat, and as much as possible under light conditions in which actinic radiation has been substantially excluded.

The inkjet ink may contain more than one pigment, and may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, mechanical devices and residence conditions selected, the initial and desired final particle size, etc. In a preferred embodiment of the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

EXAMPLES

Materials

All materials used in the following examples were readily available from standard sources such as ALDRICH Chemical Co. (Belgium) and ACROS (Belgium) unless otherwise specified. The water used was deionized water.

VEEA is 2-(vinylethoxy)ethyl acrylate, a difunctional monomer available from NIPPON SHOKUBAI, Japan:

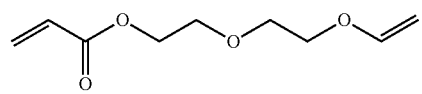

PB15:4 is an abbreviation used for HOSTAPERM™ Blue P-BFS, a C.I. Pigment Blue 15:4 pigment from CLARIANT.

PB7 is an abbreviation used for SPECIAL BLACK™ 550, which is a carbon black available from EVONIK DEGUSSA.

S35000 is an abbreviation used for SOLSPERSE™ 35000, a polyethyleneimine-polyester hyperdispersant from NOVEON.

S35000-sol is an abbreviation used for a 40 wt % solution of SOLSPERSE™ 35000 in DPGDA.

DPGDA is dipropyleneglycoldiacrylate from SARTOMER.

M600 is dipentaerythritol hexaacrylate and an abbreviation for MIRAMER™ M600 available from RAHN AG.

SR256 is 2-(2-ethoxy ethoxy)ethyl acrylate and an abbreviation for SARTOMER™ SR256 available from SARTOMER.

SR285 is SARTOMER™ 285, a tetrahydrofurfuryl acrylate monomer available from SARTOMER.

SR395 is SARTOMER™ 395, an isodecyl acrylate monomer available from SARTOMER.

CD420 is SARTOMER™ CD420, an isophoryl acrylate monomer available from SARTOMER.

SR9003 is an abbreviation for SARTOMER™ SR9003, a propoxylated neopentyl glycol diacrylate monomer available from SARTOMER.

ITX is DAROCUR™ ITX is an isomeric mixture of 2- and 4-isopropylthioxanthone from CIBA SPECIALTY CHEMICALS.

IRGACURE™ 819 is a photoinitiator available from CIBA SPECIALTY having as chemical structure:

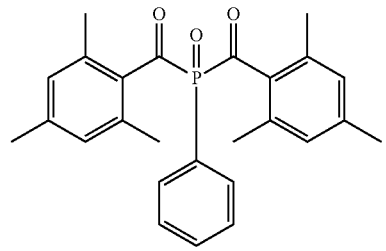

IRGACURE™ 379 is a photoinitiator available from CIBA SPECIALTY having as chemical structure:

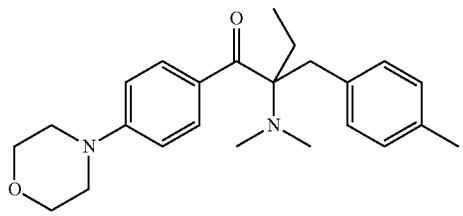

IRGACURE™ 907 is 2-methyl-1-[4-(methylthio)phenyl]-2-morpholino-propan-1-one, a photoinitiator available from CIBA SPECIALTY CHEMICALS.

EPD is ethyl 4-dimethylaminobenzoate, available under the trade name of GENOCURE™ EPD from RAHN AG.

TPO is an abbreviation used for GENOCURE™ TPO is 2,4,6-trimethylbenzoyl-diphenyl-phosphineoxide from RAHN AG.

BYK™ UV3510 is a polyether modified polydimethylsiloxane wetting agent available from BYK CHEMIE GMBH.

GENORAD™ 16 is a polymerization inhibitor from RAHN AG.

Measurement Methods

1. Curing Speed

The curing speed of the radiation curable compositions was evaluated using a Fusion DRSE-120 conveyer, equipped with a Fusion VPS/1600 lamp (D-bulb), which transported the samples under the UV-lamp on a conveyer belt at a speed of 20 m/min. The curing speed was defined as the percentage of the maximum output of the lamp needed to fully cure the samples. The lower the number the higher curing speed. A sample was considered as fully cured at the moment scratching with a Q-tip caused no visual damage.

A percentage of more than 100% of the maximum output of the lamp means that the speed of the conveyer belt had to be reduced to get the sample fully cured at the maximum output of the lamp. The higher the percentage, the more the belt had to be slowed down. A percentage lower than 80% is considered to be of practical use.

2. Viscosity

The viscosity of the formulations was measured using a Brookfield DV-II+ viscometer at 25° C. at 3 rotations per minute (RPM) using a CPE 40 spindle.

3. Weight Loss % & Latency

The weight loss was measured after keeping an UV curable ink in an open container for 200 h at 40° C. The weight loss is expressed as a wt % based on the original weight of the UV curable ink.

The weight loss is indicative for latency according to Table 1 below.

TABLE 1

| Weight loss % | Latency |
|---|---|
| <10% | excellent |
| 10-20% | good |
| >20% | unacceptable |

4. Average Particle Size

The average particle size diameter was determined with a Nicomp 30 Submicron Particle Analyzer available from Particle Sizing Systems and is based upon the principle of dynamic light scattering. The ink or dispersion was diluted with ethyl acetate to a pigment concentration of 0.002 wt %.

Example 1

This example illustrates the relation between the outer nozzle diameter in a high nozzle density print head and the amount of 2-(2-vinyloxyethoxy)ethyl acrylate in a radiation curable inkjet ink.

Preparation of Pigment Dispersion D-1

A concentrated pigment dispersion D-1 was prepared by mixing for 30 minutes the components according to Table 2 using a DISPERLUX™ Dissolver (from DISPERLUX S.A.R.L., Luxembourg) and subsequently milling this mixture in a Eiger Lab Bead mill (from EIGER TORRANCE Ltd.) having a bead filling of 42% with 0.4 mm yttrium stabilized zirconium oxide beads ("high wear resistant zirconia grinding media" from TOSOH Co.) and milling for 100 minutes. After milling the dispersion was separated from the beads using a filter cloth.

TABLE 2

| Component | Quantity |
|---|---|
| PB15:4 | 3.4 kg |
| S35000 | 3.4 kg |
| GENORAD ™ 16 | 9 g |
| DPGDA | 28.2 kg |

The average particle size of the concentrated dispersion D-1 was 109 nm measured with a Nicomp 30 Submicron Particle Analyzer.

Preparation of UV Curable Inkjet Inks

The UV curable inkjet inks Ink-1 to Ink-7 were prepared by adding to the cyan pigment dispersion D-1, the components according to Table 3. The weight % (wt %) of the components are based on the total weight of the UV curable inkjet ink. Only Ink-6 and Ink-7 contain 2-(2-vinyloxyethoxy)ethyl acrylate.

TABLE 3

| wt % of compound: | Ink-1 | Ink-2 | Ink-3 | Ink-4 | Ink-5 | Ink-6 | Ink-7 |
|---|---|---|---|---|---|---|---|
| Dispersion D-1 | 15.00 | 15.00 | 15.00 | 15.00 | 15.00 | 15.00 | 15.00 |
| SR9003 | 75.55 | 40.55 | 30.55 | 40.55 | 35.55 | 62.55 | 35.55 |
| SR 256 | 0.00 | 35.00 | 0.00 | 0.00 | 0.00 | 0.00 | 0.00 |
| SR 285 | 0.00 | 0.00 | 45.00 | 0.00 | 0.00 | 0.00 | 0.00 |
| SR 395 | 0.00 | 0.00 | 0.00 | 35.00 | 0.00 | 0.00 | 0.00 |
| CD420 | 0.00 | 0.00 | 0.00 | 0.00 | 40.00 | 0.00 | 0.00 |
| VEEA | 0.00 | 0.00 | 0.00 | 0.00 | 0.00 | 13.00 | 40.00 |
| GENORAD ™ 16 | 0.85 | 0.85 | 0.85 | 0.85 | 0.85 | 0.85 | 0.85 |
| ITX | 2.00 | 2.00 | 2.00 | 2.00 | 2.00 | 2.00 | 2.00 |
| IRGACURE ™ 907 | 4.00 | 4.00 | 4.00 | 4.00 | 4.00 | 4.00 | 4.00 |
| EPD | 2.50 | 2.50 | 2.50 | 2.50 | 2.50 | 2.50 | 2.50 |
| BYK ™ UV3510 | 0.10 | 0.10 | 0.10 | 0.10 | 0.10 | 0.10 | 0.10 |

The viscosity, curing speed and weight loss was determined for each UV curable inkjet ink. The results are shown in Table 4.

TABLE 4

| Ink | Viscosity (mPa·s) | Curing speed | Weight Loss % | Latency |
|---|---|---|---|---|
| Ink-1 | 12.3 | 75% | 1.1 | excellent |
| Ink-2 | 6.3 | 90% | 10.5 | good |
| Ink-3 | 6.1 | 75% | 27.7 | unacceptable |
| Ink-4 | 5.9 | 85% | 6.9 | excellent |

TABLE 4-continued

| Ink | Viscosity (mPa·s) | Curing speed | Weight Loss % | Latency |
|---|---|---|---|---|
| Ink-5 | 6.4 | >100% | 20.0 | unacceptable |
| Ink-6 | 9.4 | 60% | 4.2 | excellent |
| Ink-7 | 6.5 | 60% | 10.2 | good |

Only the UV curable inkjet inks Ink-1, Ink-6 and Ink-7 have a good curing speed and latency.

Figure 2:
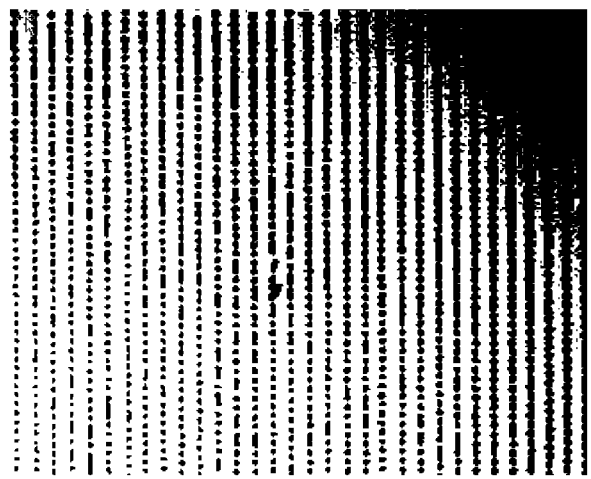
Figure 3:
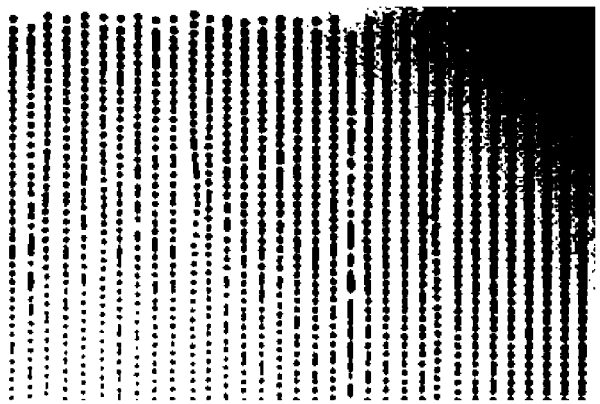

Reliable inkjet printing with a certain nozzle diameter is determined experimentally. One experiment wherein straight lines of ink droplets are jetted is shown for the inks Ink-1, Ink-6 and Ink-7, containing respectively 0 wt %, 13 wt % and 40 wt % of VEEA, in FIG. 1 to FIG. 3 for an outer nozzle diameter of 29 μm (droplet volume=18 pL, fire frequency=14.2 kHz). It can be seen from FIG. 3 that deviant lines are clearly visible (see e.g. vertical lines 11 and 25 counted from the left side), while FIG. 1 shows no deviant lines and FIG. 2 shows one deviant line of ink dots. However in a similar experiment but using a print head with an outer nozzle diameter of 18 μm, no reliable inkjet printing was obtained with Ink-1 or Ink-6. Only the prints made with Ink-7 exhibited no deviant lines.

Example 2

This example illustrates the effect on reliable inkjet printing of the concentration of VEEA in the inkjet ink.

Preparation of Pigment Dispersion D-2

A concentrated pigment dispersion D-2 was prepared by mixing for 30 minutes the components according to Table 5 using a DISPERLUX™ Dissolver (from DISPERLUX S.A.R.L., Luxembourg) and subsequently milling this mixture in a DYNOMILL ECM POLY mill (from BACHOFEN GmbH) having a bead filling of 42% with 0.4 mm yttrium stabilized zirconium oxide beads ("high wear resistant zirconia grinding media" from TOSOH Co.) and milling for 140 minutes at a rotation speed of 14.7 m/s. After milling the dispersion was separated from the beads using a filter cloth.

TABLE 5

| Component | Quantity |
|---|---|
| PB7 | 5,145 g |
| PB15:4 | 1,855 g |
| S35000 | 7000 g |
| GENORAD ™ 16 | 700 g |
| DPGDA | 20,300 g |

The average particle size of the concentrated dispersion D-2 was 106 nm measured with a Nicomp 30 Submicron Particle Analyzer.

Preparation of UV Curable Inkjet Inks

The UV curable inkjet inks Ink-8 to Ink-11 were prepared by adding to the black pigment dispersion D-2, the components according to Table 6. The weight % (wt %) of the components are based on the total weight of the UV curable inkjet ink.

TABLE 6

| wt % of compound: | Ink-8 | Ink-9 | Ink-10 | Ink-11 |
|---|---|---|---|---|
| Dispersion D-2 | 15.00 | 15.00 | 15.00 | 15.00 |
| DPGDA | 23.95 | 8.95 | 3.95 | 1.10 |
| VEEA | 35.00 | 50.00 | 55.00 | 58.85 |

TABLE 6-continued

| wt % of compound: | Ink-8 | Ink-9 | Ink-10 | Ink-11 |
|---|---|---|---|---|
| M600 | 10.00 | 10.00 | 10.00 | 9.00 |
| GENORAD ™ 16 | 1.00 | 1.00 | 1.00 | 1.00 |
| ITX | 5.00 | 5.00 | 5.00 | 5.00 |
| EPD | 5.00 | 5.00 | 5.00 | 5.00 |
| TPO | 4.95 | 4.95 | 4.95 | 4.95 |
| BYK ™ UV3510 | 0.10 | 0.10 | 0.10 | 0.10 |

The viscosity and curing speed was determined for each UV curable inkjet ink. The results are shown in Table 7.

TABLE 7

| Ink | Viscosity (mPa·s) | Curing speed |
|---|---|---|
| Ink-8 | 7.4 | 50% |
| Ink-9 | 6.4 | 50% |
| Ink-10 | 6.1 | 55% |
| Ink-11 | 5.6 | 55% |

The inks Ink-8 to Ink-11 were jetted on an ink-receiver using a Kyocera KJ4B print head with a driving voltage of 24 V to produce images at 600×300 dpi resolution with 1 dpd drops. The nozzle diameter was 20 μm.

Figure 4:
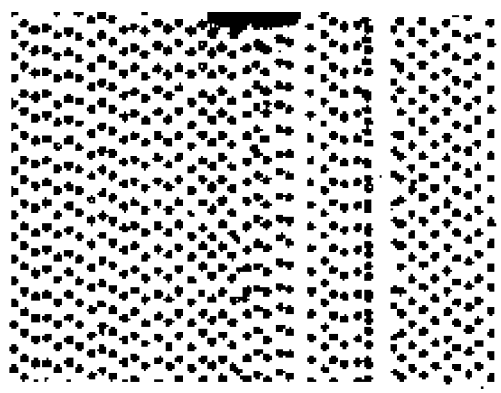
Figure 5:
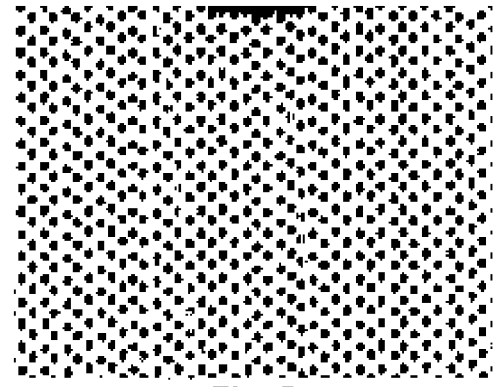

Reliable inkjet printing was only possible with the inkjet inks Ink-9 to Ink-11, although the inkjet ink-8 had a weight loss % of 8.7% (excellent latency), while the inkjet ink-11 had a weight loss % of 11.2% (good latency). This is illustrated by FIG. 4 showing the poor print results with Ink-8 and by FIG. 5 showing the excellent print results with Ink-11.

Applying the Formula (I) in accordance with the invention, the wt % A of VEEA should be between 40 wt % and 80 wt % based on the total weight of the ink. The inkjet ink Ink-8 does not comply with this criterion as it contains only 35 wt % of the difunctional monomer VEEA. The inkjet inks Ink-9 to Ink-11 do not contain a monofunctional monomer.

Example 3

This example illustrates the effect of monofunctional monomer in the UV curable inkjet composition.

Preparation of Pigment Dispersions D-3 and D-4

The concentrated pigment dispersions D-3 and D-4 were prepared by mixing for 30 minutes the components according to Table 8 using a DISPERLUX™ Dissolver (from DISPERLUX S.A.R.L., Luxembourg) and subsequently milling this mixture in a DYNOMILL ECM PRO mill (from BACHOFEN GmbH) having a bead filling of 42% with 0.4 mm yttrium stabilized zirconium oxide beads ("high wear resistant zirconia grinding media" from TOSOH Co.) and milling for 13 hours. After milling the dispersions were separated from the beads using a filter cloth.

TABLE 8

| Component | Dispersion D-3 | Dispersion D-4 |
|---|---|---|
| PB7 | 90,000 g | — |
| PB15:4 | — | 90,000 g |
| 335000-sol | 225,000 g | 225,000 g |
| GENORAD ™ 16 | 5,625 g | 5,625 g |

Preparation of UV Curable Inkjet Inks

The UV curable inkjet inks Ink-12 to Ink-14 were prepared by mixing the components according to Table 10.

TABLE 10

| g of compound: | Ink-12 | Ink-13 | Ink-14 |
|---|---|---|---|
| Dispersion D-3 | 13.75 | 13.75 | 13.75 |
| Dispersion D-4 | 5.00 | 5.00 | 5.00 |
| M600 | 6.90 | 6.00 | 6.00 |
| VEEA | 51.54 | 56.94 | 62.44 |
| SR395 | 10.00 | 5.00 | — |
| GENORAD ™ 16 | 0.81 | 0.81 | 0.81 |
| ITX | 2.00 | 2.00 | 2.00 |
| IRGACURE ™ 379 | 2.00 | 2.00 | 2.00 |
| IRGACURE ™ 819 | 3.00 | 3.00 | 3.00 |
| IRGACURE ™ 907 | 5.00 | 5.00 | 5.00 |
| BYK ™ UV3510 | 0.10 | 0.10 | 0.10 |

The viscosity, curing speed and weight loss was determined for each UV curable inkjet ink. The results are shown in Table 11.

TABLE 11

| Ink | Viscosity (mPa · s) | Curing speed | Weight Loss % | Latency |
|---|---|---|---|---|
| Ink-12 | 5.6 | >100% | 13.4% | good |
| Ink-13 | 5.6 | 55% | 12.2% | good |
| Ink-14 | 5.6 | 55% | 14.7% | good |

Only the UV curable inkjet inks Ink-13 and Ink-14, containing less than 10 wt % of the monofunctional monomer SR395, exhibited good curing speed, weight loss % and latency.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A combination of:
a) an inkjet print head having a nozzle density of at least 600 dpi and including nozzles with an outer nozzle diameter D smaller than 25 μm; and
b) a UV curable inkjet composition containing 0 to 10 wt % of one or more monofunctional monomers and at least A wt % of 2-(2-vinyloxyethoxy)ethyl acrylate, wherein both wt % are based on the total weight of the UV curable inkjet composition, and
A is defined by Formula (I):

$$100 \text{ wt \%} - D \times 3.0 \text{ wt \%/μm} \leq A \leq 100 \text{ wt \%} - D \times 1.0 \text{ wt \%/μm} \quad \text{Formula (I)}.$$

2. The combination according to claim 1, wherein A is defined by Formula (II):

$$100 \text{ wt \%} - D \times 2.5 \text{ wt \%/μm} \leq A \leq 100 \text{ wt \%} - D \times 1.5 \text{ wt \%/μm} \quad \text{Formula (II)}.$$

3. The combination according to claim 1, wherein the outer nozzle diameter D is between 14 and 22 μm.

4. The combination according to claim 1, wherein the UV curable inkjet composition contains at least 10 wt % of a polyfunctional monomer based on the total weight of the UV curable inkjet composition.

5. The combination according to claim 4, wherein the polyfunctional monomer is a polyfunctional acrylate having two or more acrylate groups.

6. The combination according to claim 1, wherein the UV curable inkjet composition contains a colour pigment.

7. The combination according to claim 1, wherein the UV curable inkjet composition includes polymerizable compounds that are all acrylates.

8. The combination according to claim 1, wherein the UV curable inkjet composition contains 0 to 3 wt % of organic solvent.

9. A combination of:
a) an inkjet print head having a nozzle density of at least 600 dpi and including nozzles with an outer nozzle diameter D smaller than 25 μm; and
b) a UV curable inkjet composition containing 0 to 10 wt % of one or more monofunctional monomers and at least A wt % of 2-(2-vinyloxyethoxy)ethyl acrylate, wherein both wt % are based on the total weight of the UV curable inkjet composition, and
A is defined by Formula (I):

$$100 \text{ wt \%} - D \times 3.0 \text{ wt \%/μm} \leq A \leq 100 \text{ wt \%} - D \times 1.0 \text{ wt \%/μm} \quad \text{Formula (I)}$$

wherein the UV curable inkjet composition has a viscosity ≤8 mPa·s at 45° C. and at a shear rate of 1000 s$^{-1}$.

10. An inkjet printing system comprising:
the combination as defined by claim 1; and
a UV curing device or an e-beam curing device.

11. An inkjet printing method comprising the steps of:
a) providing an inkjet printer containing at least one inkjet print head having a nozzle density of at least 600 dpi and including nozzles with a diameter D smaller than 25 μm;
b) jetting, at a temperature between 30° C. and 50° C., a UV curable inkjet composition containing 0 to 10 wt % of one or more monofunctional monomers and at least A wt % of 2-(2-vinyloxyethoxy)ethyl acrylate, wherein both wt % are based on the total weight of the UV curable inkjet composition; and
A is defined by Formula (I):

$$100 \text{ wt \%} - D \times 3.0 \text{ wt \%/μm} \leq A \leq 100 \text{ wt \%} - D \times 1.0 \text{ wt \%/μm} \quad \text{Formula (I)};$$

c) curing the UV curable inkjet composition.

12. The inkjet printing method according to claim 11, wherein the inkjet printer includes a plurality of the inkjet print heads having a nozzle density of at least 600 dpi and including nozzles with a diameter D smaller than 25 μm.

13. The inkjet printing method according to claim 11, further comprising the step of:
printing using an UV curable inkjet ink set comprising a plurality of the UV curable inkjet compositions including at least one cyan UV curable inkjet ink, at least one magenta UV curable inkjet ink, at least one yellow UV curable inkjet ink, and at least one black UV curable inkjet ink.

14. The inkjet printing method according to claim 11, wherein a droplet volume of the UV curable inkjet composition is smaller than 20 pL.

15. An inkjet printing method comprising the steps of:
a) providing an inkjet printer containing at least one inkjet print head having a nozzle density of at least 600 dpi and including nozzles with a diameter D smaller than 25 μm;
b) jetting, at a temperature between 30° C. and 50° C., a UV curable inkjet composition containing 0 to 10 wt % of one or more monofunctional monomers and at least A wt % of 2-(2-vinyloxyethoxy)ethyl acrylate, wherein both wt % are based on the total weight of the UV curable inkjet composition;
A is defined by Formula (I):

$$100 \text{ wt \%} - D \times 3.0 \text{ wt \%/μm} \leq A \leq 100 \text{ wt \%} - D \times 1.0 \text{ wt \%/μm} \quad \text{Formula (I)};$$

c) curing the UV curable inkjet composition; and
printing a complete image in a single pass of the inkjet printer.

* * * * *